No. 762,460. PATENTED JUNE 14, 1904.
B. YCRE.
BAKING PAN.
APPLICATION FILED JULY 11, 1903.
NO MODEL.
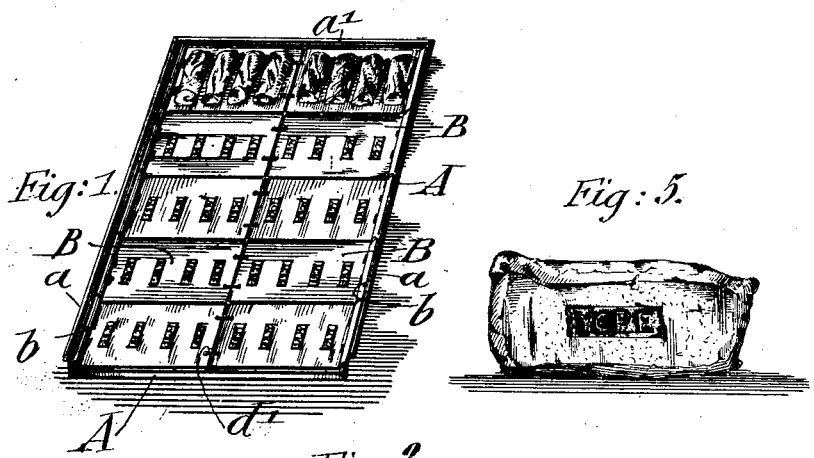
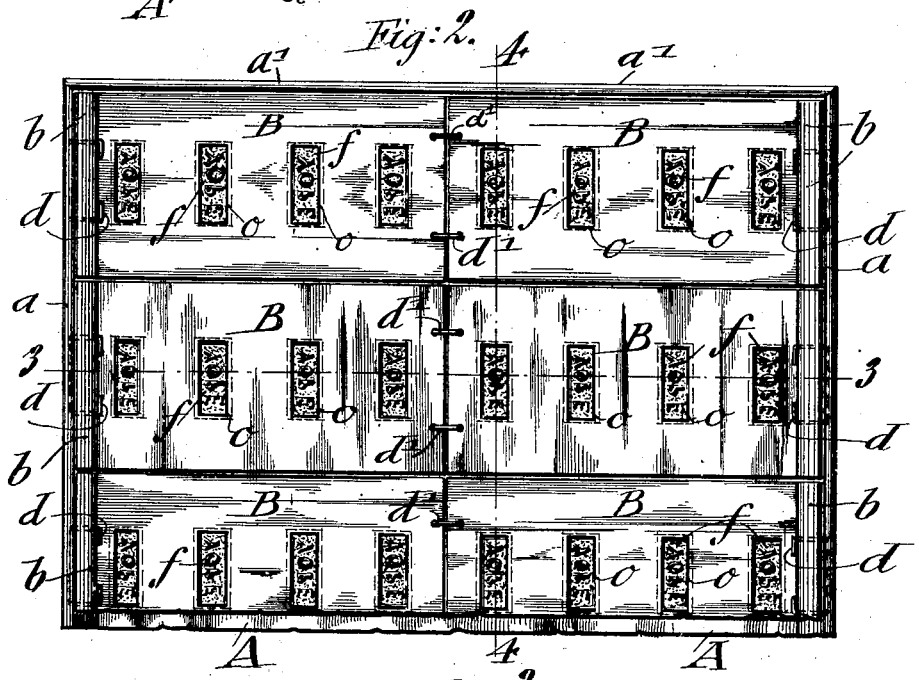
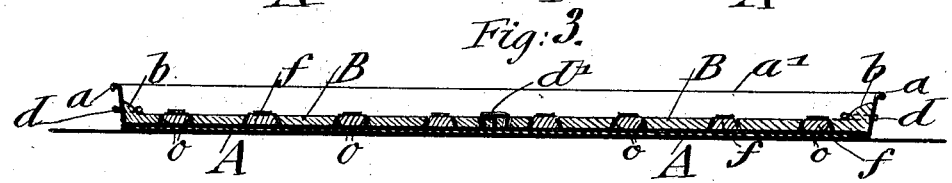
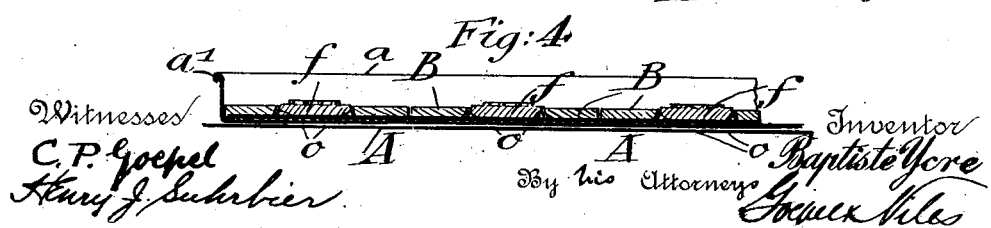
Witnesses
C. P. Goepel
Henry J. Suhrbier
Inventor
Baptiste Ycre
By his Attorneys
Goepel Niles No. 762,460. Patented June 14, 1904.

UNITED STATES PATENT OFFICE.

BAPTISTE YCRE, OF NEW YORK, N. Y.

BAKING-PAN.

SPECIFICATION forming part of Letters Patent No. 762,460, dated June 14, 1904.

Application filed July 11, 1903. Serial No. 165,058. (No model.)

*To all whom it may concern:*

Be it known that I, BAPTISTE YCRE, a citizen of the United States, residing in New York, borough of Manhattan, and State of New York, have invented certain new and useful Improvements in Baking-Pans, of which the following is a specification.

This invention relates to certain improvements in pans for bakers' use for baking rolls, French bread, and similar articles.

The ordinary bakers' ovens now in general use hold between five hundred and one thousand rolls. When the rolls are baked, they are gradually pulled out of the oven, the first ones being those at the end of the oven. For doing so it is necessary to make room in the front of the oven near the door. In the room thus obtained other rolls are drawn, and it often happens that they are thrown one over the other. In pulling out the rolls there are always some that roll over on the sole of the oven, and it is then necessary to get them off with the peel, which causes loss of time and a reduction of the temperature of the oven, so as to require the oven to be heated up again for the next baking. Furthermore, if the rolls are not quickly withdrawn from the oven every time a charge is baked it is necessary to heat up the oven again, which is not necessary if the rolls could be quickly withdrawn, so that at one heat two or three ovenfuls of rolls can be baked.

Generally speaking, an oven is never heated equally in all its parts. Near the fire the temperature is higher than the middle of the oven, while it is lower in the rear corners. The consequence is that in an oven full of rolls some are overbaked, others are well baked, and the remaining ones are not baked enough.

The object of my improved baking-pan is to obviate the objections referred to and to charge the oven first with my improved pans to subject them to a preliminary heating, so that they can become hot. Then the hot pans are withdrawn and the rolls or bread put on the same. After placing the rolls on the pans they are put back into the oven. The pans located for the preliminary heating near the fire are the hottest, and these pans after being charged with rolls or bread are put into that part of the oven where the temperature is usually lowest, while the pans that were for the preliminary heating in the cooler parts of the oven are placed near the hottest part or near the fire. Thereby all the rolls will be baked equally and no loss will occur due to under or over baked rolls.

When the rolls are baked, the pans are taken out of the oven, those near the door being first removed, so as to make room for the others, which are gradually withdrawn and the rolls or bread removed from the same. The pans are then returned into the oven, so as to keep them hot. When all the pans are empty, new rolls or bread are placed in position in the same and placed in the oven, as before described.

By using the improved baking-pans the rolls can be easily charged into the oven and removed from the same without having to keep the door of the oven open too high, whereby the oven is prevented from cooling off too quickly, as heretofore, so that more ovenfuls of rolls can be baked at each heat of the oven than heretofore. The baking of the rolls in pans, furthermore, keeps them cleaner and neater than when baked on the sole of the oven, so that the rolls require no cleaning before they are sent out to the customers. Iron pans have been used heretofore for baking rolls; but they impart a taste to the rolls and are objectionable on that account. Such pans can only be made use of with articles containing milk, butter, or lard, as these substances prevent this objectionable taste.

My invention consists of a baking-pan which is composed of a sheet-metal bottom having bent-up side walls, closed tiles placed on the bottom, means for attaching the tiles to the bent-up sides of the bottom and to each other; and the invention consists, further, of a baking-pan having tiles provided with suitable openings and metallic dies of dovetail shape placed in said openings, said dies having the name of the baker in raised letters, so as to imprint the same on the bottom of the rolls or bread, as will be fully described hereinafter and finally pointed out in the claims.

In the accompanying drawings, Figure 1 represents a perspective view of my improved baking-pan. Fig. 2 is a plan view of a portion of the pan drawn on a larger scale. Fig. 3 is a vertical transverse section of the same on line 3 3, Fig. 2. Fig. 4 is a vertical longitudinal section on line 4 4, Fig. 2; and Fig. 5 is a bottom view of a roll baked in my improved baking-pan.

Similar letters of reference indicate corresponding parts.

Referring to the drawings, A represents the bottom of my improved baking-pan, which is preferably made of sheet-iron and provided with bent-up side and end flanges $a\ a'$. On the bottom A are placed oblong tiles B of suitable thickness, which are provided at the ends adjacent the side walls with raised portions $b$, so that the unbaked rolls cannot come in contact with the metallic side walls $a$. The raised ends $b$ of the tiles B are provided with perforations adjacent to corresponding perforations in the side walls $a$, so that wire links or staples $d$ can be passed through the side walls $a$ and the holes in the ends $b$ of the tiles B for attaching the tiles in position on the bottom A. The inner adjacent edges of the tiles B are also connected by suitable wire staples $d'$, so that the tiles cannot be shifted out of position at their inner ends.

Some bakers desire to have their names on the bottom of the rolls, bread, and other articles. In this case the tiles are provided with oblong openings $o$ of suitable size, the sides of which are beveled, said openings serving for receiving cast-metal dies $f$, provided with raised letters representing the name of the baker. These dies $f$ are provided with dovetail sides, so as to fit into the oblong openings $o$ after the same are placed in position from below the tiles B, as shown in Figs. 3 and 4. The rolls are placed in position so as to be over the dies, so that the dies imprint the name in intaglio into the bottom of the roll, whereby after the rolls are baked the name appears distinctly thereon, as shown in Fig. 5. When bread or other large articles are baked, the unbaked loaves cover up a number of dies, in which case the name is repeated several times in the bottom of the loaves.

On pans of this construction the rolls, bread, and other articles can be baked in a more equal manner for the reason that the pans with their tiles being heated up before the unbaked rolls, bread, or other articles are placed on the same assist by their heat in the baking operation, so that a greater yield of uniform and nicely-baked rolls, bread, &c., is obtained.

By the use of my improved baking-pans the baking of rolls, bread, &c., is accomplished in an equal and more perfect manner than heretofore, as the differences of temperature in different parts of the oven are overcome by the preheating of the tiles of the pans, while a cleaner and neater roll is obtained, as it is not placed in contact with the sole of the oven. Furthermore, the charging and withdrawing of the pans is accomplished much quicker than the withdrawing of the individual rolls or bread, as heretofore, by means of the peel, so that several ovenfuls can be baked with one heat of the oven.

Having thus described my invention, I claim as new and desire to secure by Letters Patent—

1. A baking-pan, consisting of a sheet-metal bottom provided with side walls, tiles provided with raised portions supported on said bottom, and means passing through said raised portions for attaching the tiles to the side walls of the bottom, substantially as set forth.

2. A baking-pan, consisting of a sheet-metal bottom provided with side walls, tiles provided with raised portions supported on said bottom, means passing through said raised portions for attaching the tiles to the side walls of the bottom, and means for connecting the inner abutting ends of the tiles with each other, substantially as set forth.

3. The combination, with a baking-pan consisting of a sheet-metal bottom having bent-up side walls, of tiles placed on said bottom and connected at one end with said side walls and at the other end with each other, said tiles being provided with openings, and name-forming dies in said openings, substantially as set forth.

4. The combination, with a baking-pan consisting of a sheet-metal bottom having bent-up side walls, of tiles placed on said bottom and connected at one end with said side walls and at the other end with each other, said tiles being provided with openings having beveled sides, and name-dies provided with flaring or dovetail sides for fitting into the openings of the tiles, substantially as set forth.

5. The combination with a baking-pan consisting of a sheet-metal bottom, of tiles provided with openings placed on said bottom, and name-forming dies in said openings, substantially as set forth.

In testimony that I claim the foregoing as my invention I have signed my name in presence of two subscribing witnesses.

BAPTISTE YCRE.

Witnesses:
   PAUL GOEPEL,
   C. P. GOEPEL.